(No Model.) 3 Sheets—Sheet 2.
C. F. HOLT.
SHIP'S LOG.

No. 495,587. Patented Apr. 18, 1893.

Witnesses Inventor
Charles F. Holt,
By his Attorney (No Model.) 3 Sheets—Sheet 3.
C. F. HOLT.
SHIP'S LOG.
No. 495,587. Patented Apr. 18, 1893.
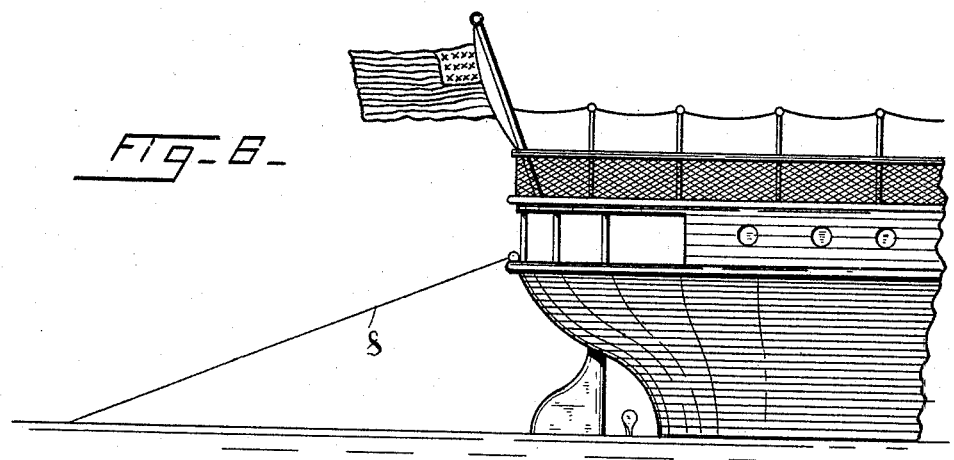
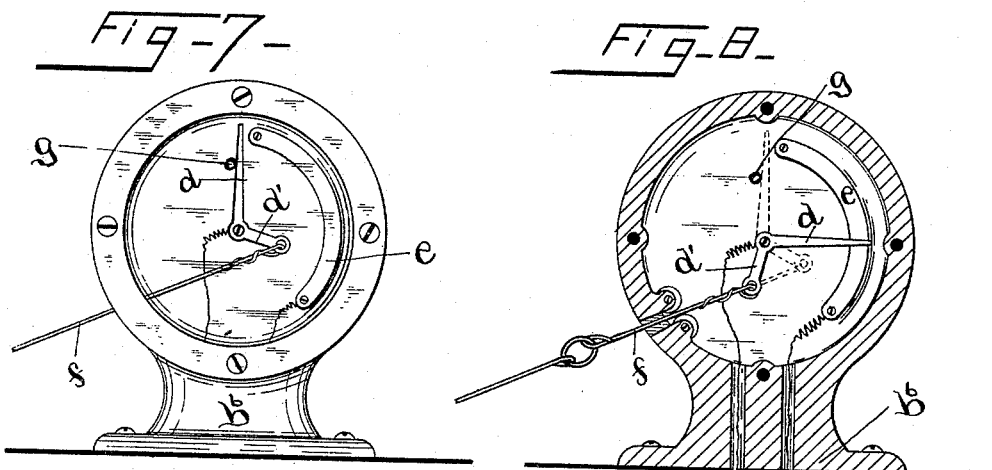
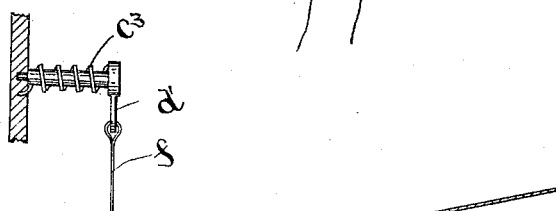
Witnesses
Alonzo M. Luther.
Allen Tenny.
Inventor
Charles F. Holt,
By Attorney
Frank H. Allen.
THE NORRIS PETERS CO., PHOTO-LITHO., WASHINGTON, D. C.

UNITED STATES PATENT OFFICE.

CHARLES F. HOLT, OF NEW LONDON, CONNECTICUT, ASSIGNOR OF ONE-HALF TO WILLIAM S. STARR, OF SAME PLACE.

SHIP'S LOG.

SPECIFICATION forming part of Letters Patent No. 495,587, dated April 18, 1893.

Application filed July 25, 1892. Serial No. 441,108. (No model.)

*To all whom it may concern:*

Be it known that I, CHARLES F. HOLT, a citizen of the United States, residing in the city and county of New London and State of Connecticut, have invented certain new and useful Improvements in Speed-Indicators, which improvements are fully set forth and described in the following specification, reference being had to the accompanying three sheets of drawings.

This invention relates to a new system of electrically actuated mechanism for indicating and registering the speed of vessels, (either steam or sail) and has for its object the production of more accurate results than have been reached heretofore with so-called "logs." It also seeks to provide a system of registration that may be readily transmitted to, and read at, different parts of the vessel, as for example in the pilot house, engine room, cabin, &c.

In the ordinary log, towed astern at the end of several hundred feet of cord, the recording mechanism (controlled by a propeller wheel) is not sensitive enough to automatically adjust itself to slight changes of speed and in consequence the registered result is only approximately correct. My present system of speed measurement seeks to overcome this serious defect and to indicate accurately the distance traversed whatever may be the speed of the vessel.

Figure 1:
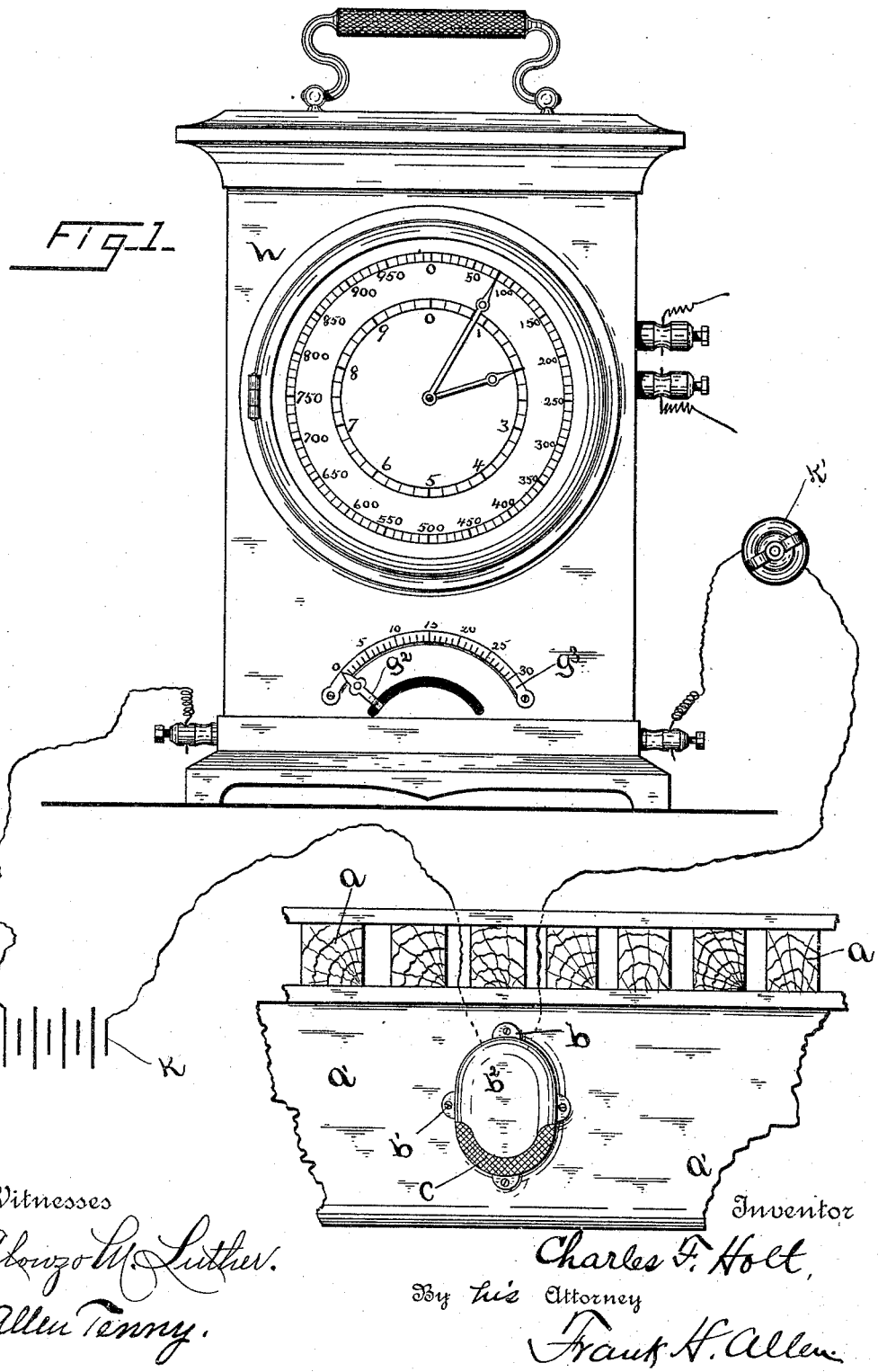
Figure 2:
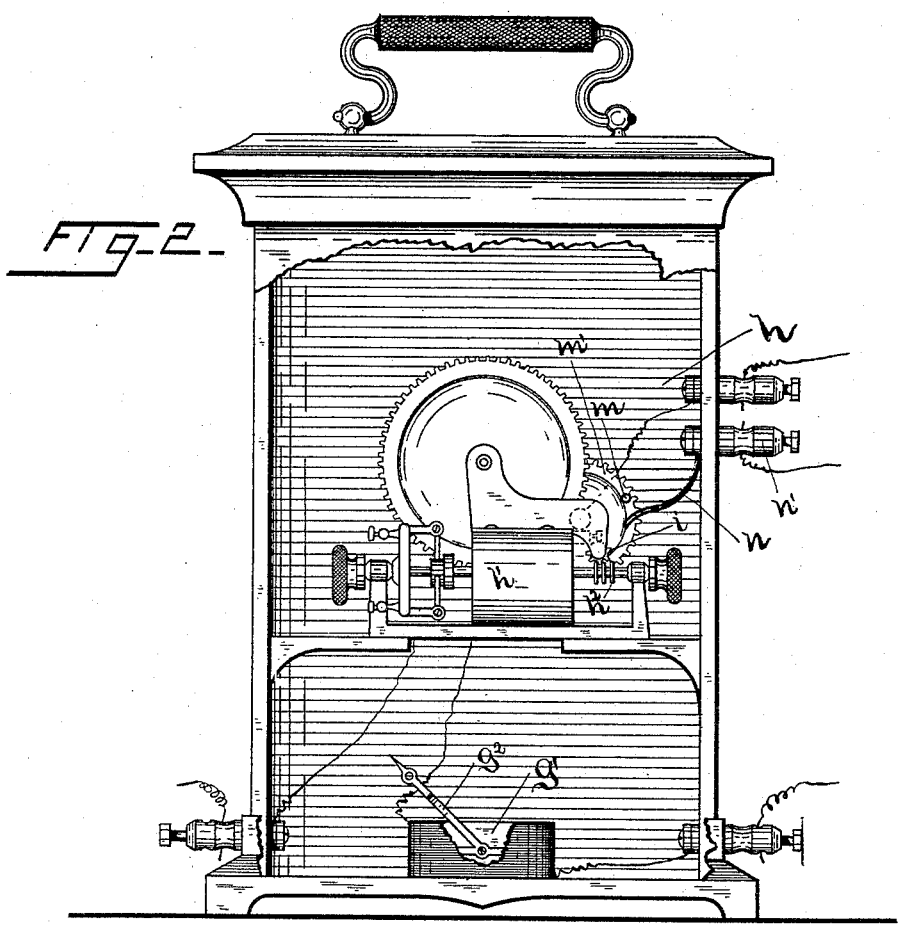
Figures 3, 4, 5:
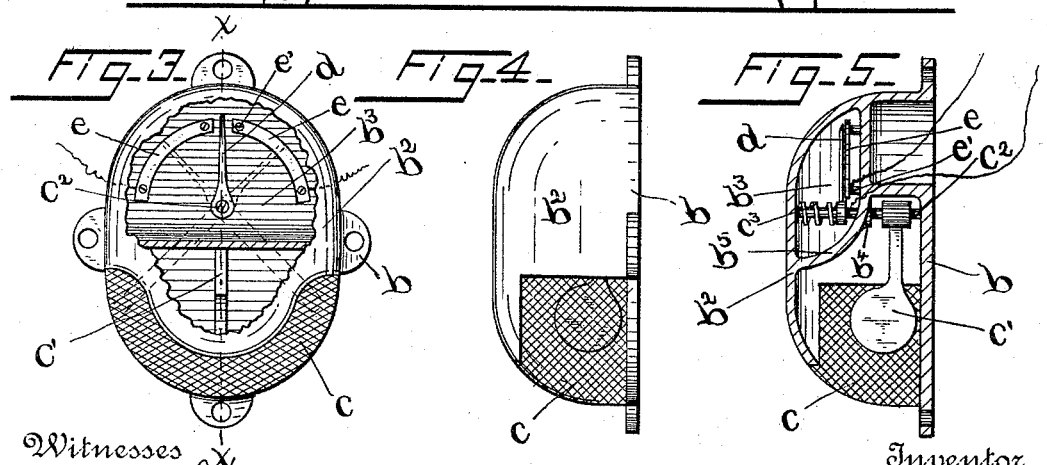

The annexed drawings illustrate my invention, Figure 1 being a front elevation of the indicator proper, used as one element of my complete system and said figure also shows an ammeter, switch, battery and pressure gage, all in a single electric circuit. Each of said elements is described in detail hereinafter. Fig. 2 shows the case which incloses the indicator mechanism and ammeter, with its front face removed to expose the interior parts. Fig. 3 is a front view of the pressure gage of Fig. 1 detached and enlarged, its case being largely cut away, and Fig. 4 is a side view of the same. Fig. 5 is a sectional view of said gage on line $x$—$x$ of Fig. 3. In Figs. 6, 7, 8, 9 and 10 I have illustrated a modification of my invention in which the pressure gage is located inboard and actuated by a drag towed astern, instead of being attached to the vessel below the water line and actuated by a lever in contact with the water, as in Figs. 1 to 5. Fig. 6 illustrates in a general way the manner of using said modification and Fig. 7 shows, about full size, the pressure gage as attached to a vessel's rail. Fig. 8 is a similar view in vertical section and Fig. 9 is a view of the drag used with said modification. In Fig. 10 I have illustrated simple spring mechanism for controlling (in one direction) the needle or pointer of the pressure gage.

My invention consists, in brief, of a drag located beneath the water-line of a vessel, and connected mechanism, consisting of a simple form of rheostat which is traversed by a contact lever (controlled by said drag) in such manner that any variation in the speed of the vessel acting upon the drag to vary the degree of resistance, will cause said lever to move in like proportion, upon the rheostat to vary the strength of the electric current: which current actuates certain mechanisms inboard to show both the speed at which the vessel travels and the number of miles traveled in a given time. I have shown two slightly different ways of connecting said drag with the pointer that forms a part of the rheostat and will describe first that one illustrated by Figs. 1, 3, 4 and 5. Fig. 1 shows the manner of attaching said drag to a vessel, the letter $a$ denoting the rib timbers and $a'$ the keel. Said drag is formed with a base $b$ of substantially oval form as here shown, and is attached to the keel by screws or bolts $b'$. Projecting outward from said base is a housing $b^2$ that covers the upper portion of the base and provides a water tight chamber $b^3$. The lower portion of the housing is cut away and replaced by a wire screen $c$. Within the place inclosed by said wire screen is located a lever arm $c'$ of paddle form, that is secured to a shaft $c^2$ journaled in base $b$ and the housing $b^2$. Said shaft extends through a stuffing box $b^4$ in a wall $b^5$ that separates the chamber $b^3$ and the lower, open portion of the housing and upon the shaft $c^2$ within chamber $b^3$ is mounted a radial pointer $d$ whose free end in its normal position rests between the confronting ends of the arc-shaped bars $e$ of German silver which arcs are supported upon studs $e'$ of insulating material. From the outer ends of each of said arcs $e$, wires lead together and thence up into the vessel and a similar wire also leads from the pivot shaft $c^2$. An open circuit is maintained when the vessel is at rest and the pointer $d$ in the position shown in full lines in Fig. 3. When, however, the vessel is under way, in either direction the lever-paddle $c'$ is swung from its perpendicular position (against the retractile force of a spring $c^3$ upon its shaft) thus causing the pointer $d$ to come in contact with the inner end of one of said arcs and closing the otherwise open circuit. When the pointer is brought into contact with the arc of German silver the latter, as is well known, will serve as a powerful resistant and the electric current will be weak but, as the vessel's speed is increased and the lever-paddle yields still more to the resistance of the water, the pointer is correspondingly moved toward the outer end of said arc thus reducing proportionately, the length of the resistance bar or arc, between the pointer and the outer end of said arc. In like proportion as the area of the resistance arc is lessened by the forward movement of the pointer, the strength of the electric current is increased. The spring $c^3$ should be of such graduated tension, that a very slow movement of the vessel will swing the pointer into contact with the arc to close the circuit, the maximum speed of said vessel being required to force said pointer to the extreme outer end of said arc. The described oval form of the housing $b^2$ and screen $c$ prevent floating or swimming material, as seaweed, from lodging against said housing and checking the flow of water through the screen. The resistance gage thus far described has the advantages of being a fixture upon the vessel, always ready for use, and of serving to indicate movements of the vessel either forward or aftward. I have described it as being attached to the keel but it could be as readily attached to the bilge or any other portion below the water line, where unobstructed contact with the water current could be assured.

In Figs. 6 to 10 the same general plan prevails, as that already described but instead of providing a lever in paddle form which drags in the water I have substituted for said paddle a fine line of wire $f$ that is secured to an angle arm $d'$ forming a part of the pointer $d$, and at the outer end of said line I have attached a drag consisting preferably of several feet of larger cable $f'$. I find in practice that the fine line $f$ cuts through the water freely without regard to its length, thus enabling me to locate the resistance gage or rheostat higher or lower above the water line, according to the size of the vessel, without varying the "pull" of the drag $f'$ which latter tows under water and always exerts a steady pull upon the pointer, when going at a given speed. In this modification of my invention only one resistance bar $e$ is provided, so that only the forward movement of the vessel is registered.

The housing of the resistance gage in said modification is provided with a base $b^6$ that is fastened to the ship's rail, or other place easy of access and the electric wires run to any part of the vessel where it is desired to locate an indicator and register, in precisely the same manner as if the resistance gage was located below the water line as first described. A spring $c^3$ is also provided to hold the pointer of said modification normally in contact with a stop-pin $g$ projecting from the rear wall of the housing. The front face may be of glass so that the interior parts, and their movements may be observed at all times.

Having described my resistance gage and the drag that controls it I will now describe my register, indicator and other elements in circuit with said resistance gage.

Referring to Figs. 1 and 2, $h$ denotes a case of convenient form, in which are located an ammeter $g'$ of ordinary construction and electrically actuated recording mechanism by means of which latter the distance traversed by the vessel is so registered that it may be read at a glance. As here shown said mechanism registers, by means of the smaller pointer, each quarter mile and by the larger pointer every ten miles traveled, up to one thousand miles, when the pointers may be reset at zero.

The register mechanism consists of an electro-motor $h'$ of any simple form, having upon its shaft a worm $h^2$ meshing with a gear $i$ that forms the initial or driving gear of a train calculated to move the pointers to produce the results above described, but as said train forms no part of my present invention I have thought it unnecessary to illustrate and describe it in detail here. The needle of the ammeter $g'$ has secured to it a pointer $g^2$ that projects outside the case $h$ (see Fig. 1) and coacts with a graduated curved scale $g^3$ to indicate the speed of the vessel.

$k$ denotes a battery and $k'$ a switch both being of any approved form.

When my invention is in service and the vessel to which it is attached is gotten under way, the resulting pressure of water upon the drag brings the pointers $d$ into contact with the arc-shaped piece $e$, thus closing the circuit and maintaining a current of low power which correspondingly energizes the ammeter and causes its pointer to move along the graduated scale $g^3$ and also simultaneously sets in slow revolution the motor $h'$ and its connected train, thus causing the hands of the register to crawl slowly along their respective dials. As the speed of the vessel increases and the pointer $d$ advances along the resistance piece $e$, the current throughout the circuit is correspondingly strengthened. The pointer of the ammeter is then advanced upon its graduated scale to indicate the increased speed of the vessel and the registering mechanism also quickens its pace in order to accurately record the distance traveled. The graduated scale of the ammeter is preferably marked to indicate the number of miles traveled per hour: that is to say when the pointer rests at the mark "5" it indicates that the ship is traveling at the rate of five miles per hour. Thus it will be seen that by means of my described invention any variation of the speed of the vessel is immediately indicated by the ammeter and also that the distance traversed by the ship is accurately registered, whatever may be the rate of speed.

It is sometimes desirable to have the speed and distance noted in different parts of the ship as for example, in the pilot house, chart room and cabin and to provide for such contingency I have added to my described registering mechanism a simple device (shown in Fig. 2) for making and breaking the circuit consisting of a pin $m$ in one of the gears $m'$ of the register train and a spring arm $n$ secured to a binding post $n'$ fastened to the register case. An independent electric circuit is then provided including a battery and one or more registers substantially like that shown in my United States Patent No. 475,399, issued May 24, 1892. At each revolution of the wheel $m'$ the auxiliary circuit is closed and the hands of its register or registers are moved forward one step to correspond to the movements of the parent register.

It will be obvious that the ammeter could be dispensed with in which case only the distance traveled would be indicated, or the register could be removed from the circuit in which case only the rate of speed would be indicated.

Having described my invention, I claim—

1. A distance register for vessels, having in combination in and with an electric circuit, a motor with connected train of registering mechanism as set forth, a battery and resistance gage, and a submerged drag connected with said resistance gage, substantially as specified.

2. In a speed indicator, in combination in and with an electrical circuit containing distance registering mechanism, a battery and an interposed bar of resistant material traversed by a contact pointer and a submerged drag as described, connected with and controlling the traverse movement of said pointer, all being substantially as and for the purpose specified.

3. In a speed indicator, in combination in and with an electrical circuit containing distance registering mechanism, a battery and an interposed bar of resistant material traversed by a contact pointer and a submerged drag connected with said pointer consisting of a lever of paddle form substantially as and for the purpose specified.

4. In combination in and with an electrical circuit, registering mechanism, a battery and a resistance gage, said gage being composed of a bar of resistant material, as German silver, traversed by a pointer as set forth and inclosed in a watertight chamber, the shaft of the pointer extending through the housing of said chamber and bearing upon its outer (exposed) portion a lever of paddle form which lever is inclosed by a screen substantially as and for the purpose specified.

CHARLES F. HOLT.

Witnesses:
FRANK H. ALLEN,
ALONZO M. LUTHER.